No. 741,105. PATENTED OCT. 13, 1903.
R. M. BRACKLOW.
LAMP STOVE.
APPLICATION FILED FEB. 13, 1903.
NO MODEL.
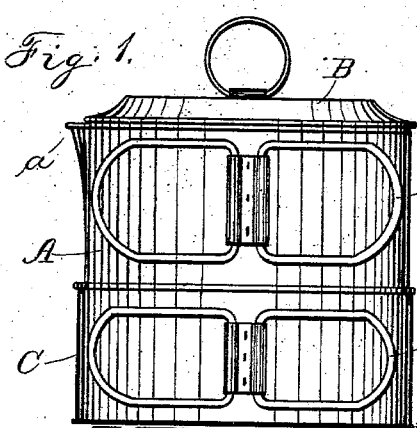
Fig. 1.
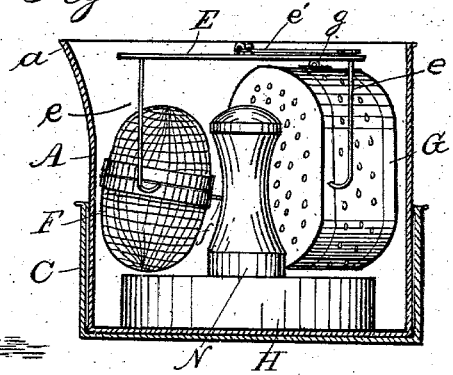
Fig. 2.
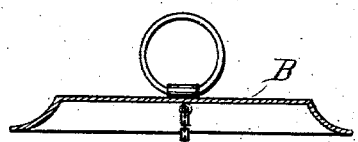
Fig. 3.
Fig. 4.
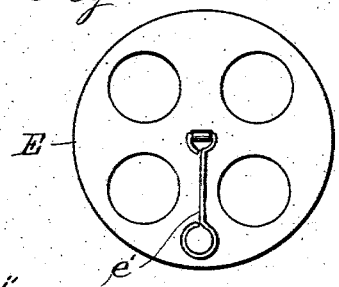
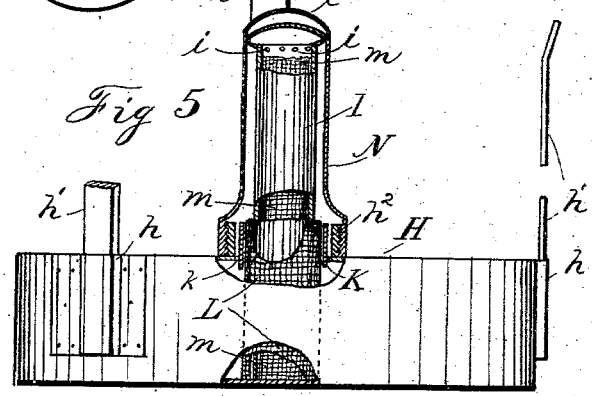
Fig. 5.
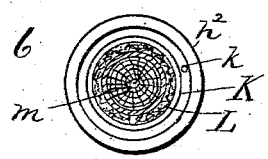
Fig. 6.
WITNESSES:
E. W. Finacom.
Geo. W. Hall
INVENTOR
Richard Max Bracklow.
BY
Chas. D. Sorrell
ATTORNEY No. 741,105. Patented October 13, 1903.

UNITED STATES PATENT OFFICE.

RICHARD MAX BRACKLOW, OF WASHINGTON, DISTRICT OF COLUMBIA.

LAMP-STOVE.

SPECIFICATION forming part of Letters Patent No. 741,105, dated October 13, 1903.

Application filed February 13, 1903. Serial No. 143,240. (No model.)

*To all whom it may concern:*

Be it known that I, RICHARD MAX BRACKLOW, a citizen of Germany, residing at Washington, in the District of Columbia, have invented certain new and useful Improvements in Lamp-Stoves; and I do hereby declare the following to be a full, clear, and exact description of the invention, such as will enable others skilled in the art to which it appertains to make and use the same.

My invention is of that class of stoves which are suitable for travelers to carry with their luggage. It is also well adapted for use in the army and navy and for explorers, picnickers, and others. It is heated by a spirit-lamp whose burner is of normal construction, and the entire outfit of lamp, egg-holder, and coffee and tea percolators are packed within the water-boiler, while the frying or stew pan is fitted upon the exterior of the boiler, thus making a single easily-portable package.

The accompanying drawings illustrate the invention, in which—

Figure 1 is a side elevation with all the parts assembled. Fig. 2 is the same, but with the boiler and stew-pan in vertical section. Fig. 3 is a section of the cover and its attachment. Fig. 4 is a plan of the egg-holder, and Fig. 5 is an elevation of the lamp enlarged and partly in section. Fig. 6 is a plan of the neck and of the stem in cross-section enlarged.

Like letters of reference denote corresponding parts in the different views.

A indicates a water-boiler, having a lip $a$.

B is the boiler-cover, to which is attached centrally underneath a chain with terminal hook $b$.

C is the pan fitting onto the bottom of the boiler A. Both the boiler and pan are furnished with swinging wire handles D D.

E is the egg-holder, having legs $e\ e$, upon which it may stand, and a central hinged rod $e'$, with terminal loop, by which it may be attached to the hook $b$ and suspended in the water in the boiler for cooking.

The tea and coffee percolators F and G have each, respectively, the loops $f$ and $g$ for attachment to the hook $b$, by which they are suspended in the water in preparing these drinks.

The lamp H has a circular flattened body forming a chamber for the alcohol or other burning fluid. Sockets $h\ h$ on its sides support standards $h'\ h'$, which support the boiler or pan. The stem I is hollow and has apertures $i\ i$ just below its covered flaring top $i''$. This stem passes loosely down through the neck $h^2$ and stands on the bottom of the lamp. Between the stem and the neck $h^2$ is a band or collar K of the same height as the neck, but extending slightly below it into the spirit-chamber. The space between the lower edge of the neck and the collar K is closed except for a small air-hole $k$.

A wick L encircles the stem from its bottom up to the top of the neck, and another wick $m$ within the neck extends from its bottom to near the apertures $i\ i$. The spirit is ignited at the top of the neck, and the flame is formed there and also flares out from the apertures $i\ i$. The exterior of the neck is threaded, and the extinguisher N is screwed upon it to prevent leakage.

What I claim, and desire to secure, is—

1. A lamp-stove having a body adapted to be used as a boiler, and as a receptacle for the lamp and cooking utensils, a cover therefor having a central, depending chain and hook, to suspend said utensils singly, within the boiler for cooking, as herein described.

2. A stove-lamp having standards to support a cooking vessel, a central, outwardly-threaded neck, a collar within said neck having a connection therewith at its lower part, an air-hole through said connection into the spirit-chamber, a hollow stem with closed spreading top, apertures in the stem just below its top, a wick in said stem and a wick encircling the lower part of said stem substantially as described.

In testimony whereof I affix my signature in presence of two witnesses.

RICHARD MAX BRACKLOW.

Witnesses:
L. M. GOTWALD,
H. W. BRASHEARS.